Jan. 26, 1943. T. M. RECTOR 2,309,139
PROCESS AND APPARATUS FOR DECAFFEINATING COFFEE
Filed Jan. 3, 1941 3 Sheets-Sheet 2

Inventor
Thomas M. Rector.
By Cameron, Kerkam + Sutton
Attorneys

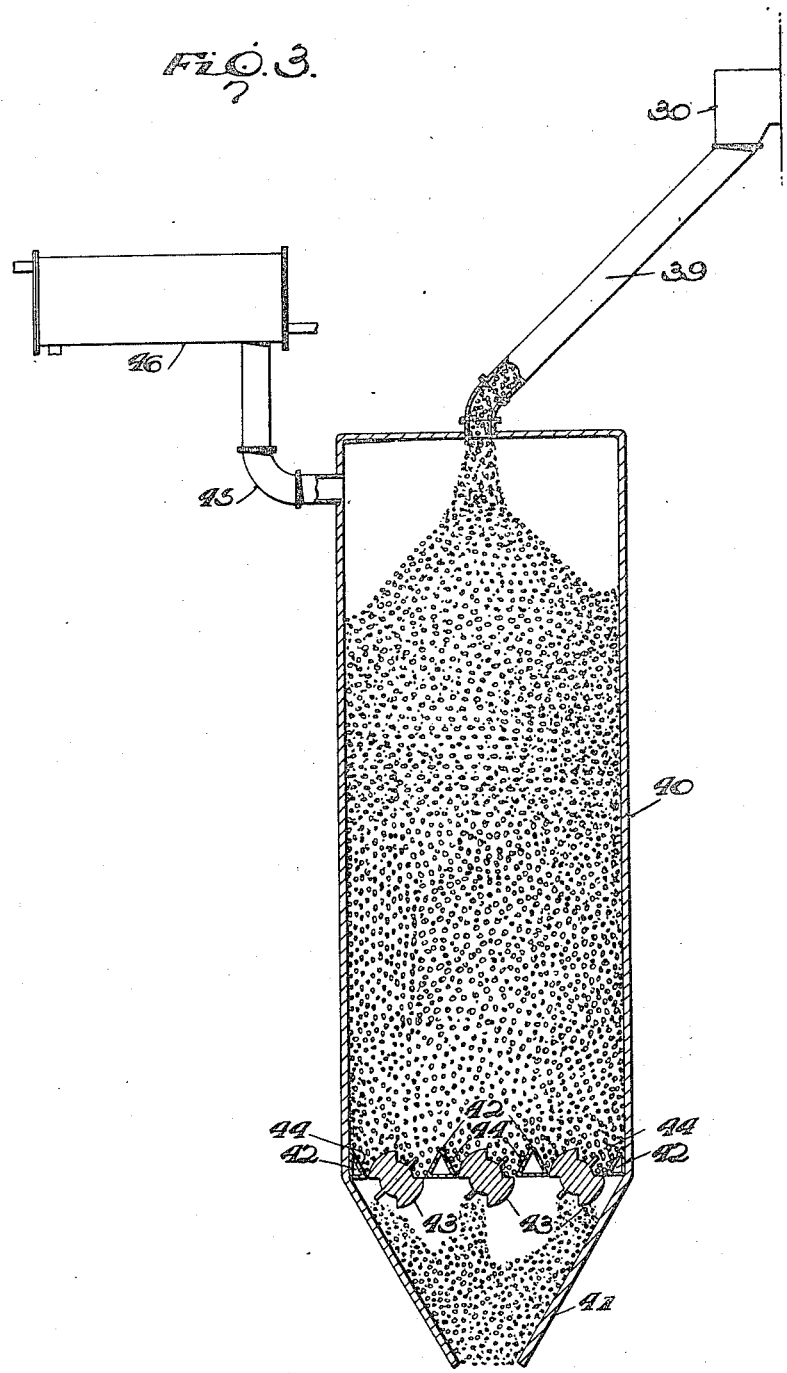

Patented Jan. 26, 1943

2,309,139

UNITED STATES PATENT OFFICE 2,309,139

PROCESS AND APPARATUS FOR DECAFFEINATING COFFEE

Thomas M. Rector, Morristown, N. J., assignor to General Foods Corporation, New York, N. Y., a corporation of Delaware Application January 3, 1941, Serial No. 373,039

14 Claims. (Cl. 99—70)

The present invention relates to a method and apparatus for decaffeinating coffee and particularly to a procedure for effecting such decaffeination continuously.

The customary procedure in extracting caffein from coffee involves first, the treatment of green beans to increase their moisture content; second, the extraction of the caffein from the moist beans by means of an organic solvent; third, the removal of the residual solvent from the extracted beans; and fourth, the drying of the treated beans to their original moisture content. Heretofore these operations have been carried out as a batch process, a batch of green coffee being placed in a drum in which the first three operations of moisture addition, caffein extraction, and solvent removal are successively carried out. Thereafter the batch of coffee is dumped out of the drum and conveyed to a batch drier where the fourth operation of driving off the added moisture is performed.

Though effective, this batch procedure necessitates the use of extensive equipment for volume production, involves high labor and material costs, and is wasteful of time. To avoid these disadvantages I propose to decaffeinate coffee continuously by performing the aforementioned operations on an uninterrupted flow of coffee beans in a manner and in apparatus that is simple, effective and novel. In its more specific aspect, the invention also involves methods and apparatus for carrying out certain of the individual steps of the complete process which in themselves are novel and capable of independent use in the art.

In accordance with the invention, the first step of treating the beans to increase their moisture content is carried out by passing them continuously through a conveyor, preferably of the screw type, in which they are stirred with water. I have found that this method of moisture addition results in uniform distribution of the added moisture throughout the beans without recourse to the use of steam, and requires the use of substantially no greater amount of water than that necessary to bring the beans to the desired moisture level. The second step of caffein extraction is carried out by causing the stream of beans to rise due to buoyancy through a downward current of solvent for caffein, while the third step of residual solvent removal is carried out by causing the stream of beans to descend due to gravity through an upward current of steam. The fourth step of drying the beans to their original moisture content may be performed in any suitable way but preferably is carried out by passing the stream of beans through a continuous drier, from which they may be passed to storage or to suitable roasting apparatus.

For a more complete understanding of the invention reference should be made to the following detailed description and accompanying drawings, which diagrammatically illustrate one form of apparatus suitable for practicing the invention, it being understood that this particular form is for purposes of illustration only and may be modified in various ways without departing from the spirit of the invention.

In the accompanying drawings:

Fig. 3 is a schematic layout, partially in section, of the residual solvent removal unit shown in Fig. 1.

Figure 1:
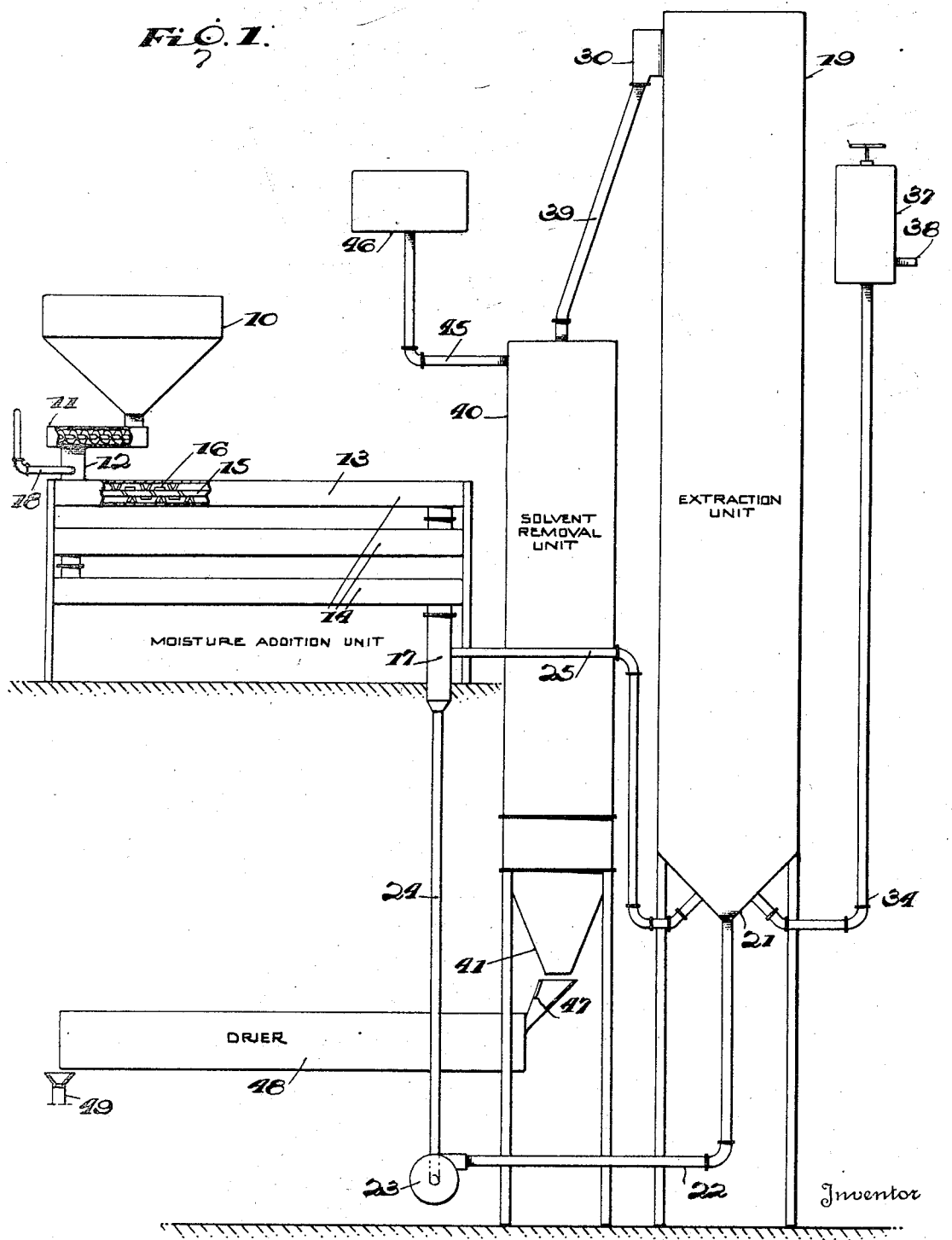
Fig. 1 is a schematic layout of one form of apparatus for carrying out my complete process.

Referring to Fig. 1, green coffee beans are continuously fed from a storage hopper 10 through a feed regulating device 11 and a passage 12 to a suitable device 13 in which the moisture content of the coffee is increased. This device may be of any suitable construction adapted to continuously advance and thoroughly stir the beans while moisture is added thereto, and in the form shown comprises a screw conveyor arranged in three superposed and communicating sections 14 to provide the desired length of coffee travel in a minimum of floor space. The screw flights in each section may be notched at intervals to ward the advance of the coffee and to insure a more effective stirring thereof. If desired, each screw-shaft 15 may also be provided with mixing paddles 16. The coffee is successively conveyed along the various sections and is discharged from the lower section into a chute 17. Water may be introduced into device 13 in various ways and as shown, is supplied through a pipe 18 communicating with intake passage 12. Cold water may be used but I have found that the treatment is expedited when water heated to a temperature of from 150° F. to 212° F. is employed.

In operation, the respective rates at which coffee and water are introduced into device 13 are preferably chosen so that substantially all of the water introduced is absorbed by the coffee in its passage through the conveyor to effect the desired increase in moisture. This controlled addition of water leaves no excess water to be drained from device 13 and consequently avoids the carrying away of any extracted water soluble substances from the coffee. Of course, the absorption of the added water by the coffee requires time, and accordingly the rate of flow and length of travel of the coffee through device 13 should be so proportioned as to insure a period of treatment sufficient for complete absorption of the added water. Preferably this period should be long enough also to include a final tempering period to permit the absorbed moisture to become uniformly distributed throughout each bean.

Figure 2:
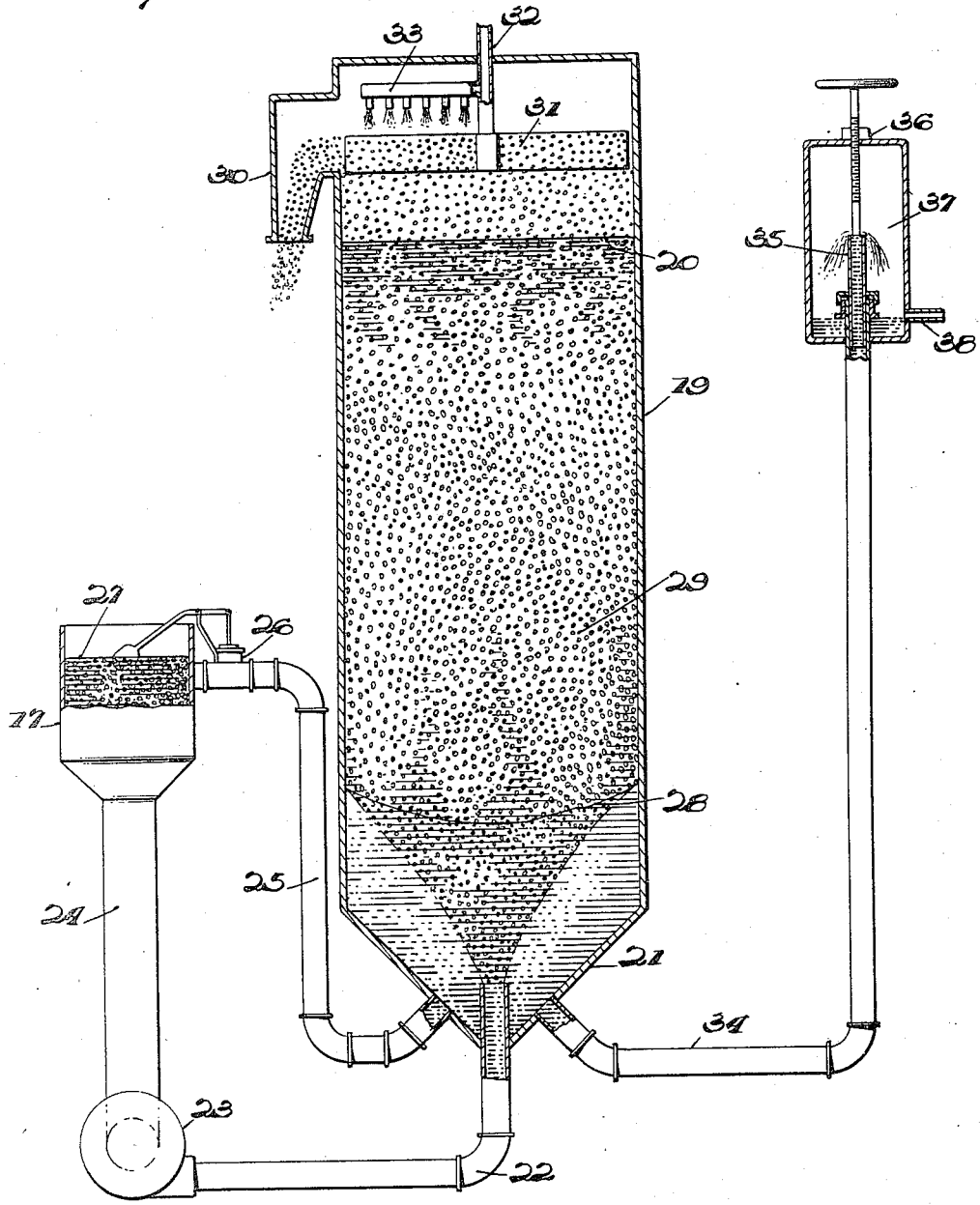
Fig. 2 is a schematic layout, partially in section, of the extraction unit shown in Fig. 1.

Referring now to Fig. 2, the extraction unit is shown as comprising a heat insulated vessel 19 adapted to contain solvent for caffein up to a predetermined level 20. The vessel 19 may be of any suitable shape, but preferably comprises a cylinder with a coned bottom 21. Centrally fitted through the coned bottom is an injector pipe 22 connected to a pump 23 having its input connected by a pipe 24 to chute 17. Spent solvent from vessel 19 is continuously introduced through a pipe 25 into chute 17, from which it flows through pipe 24 to pump 23, which pumps it back into vessel 19 through injector pipe 22. The introduction of spent solvent into chute 17 is controlled by a float valve 26 to hold it at a predetermined level 27 therein. The moist coffee discharged from device 13 into chute 17 forms a slurry with the solvent therein and thus can be readily pumped through pipe 22 into vessel 19. Pipe 25 preferably communicates with vessel 19 below the outlet of injector pipe 22 to insure against any return passage of coffee therethrough. Coffee introduced into vessel 19 being lighter than the solvent rises against the bottom 28 of the column of beans 29 which substantially fills vessel 19 and due to its buoyancy extends a substantially constant distance above the solvent level 20. Coffee from the portion of column 29 extending above the solvent level is discharged through a side chute 30 by a rotary raking mechanism 31.

Fresh solvent may be supplied to vessel 19 in any suitable manner and in the apparatus shown is continuously introduced through the hollow shaft 32 of raking mechanism 31 and discharged through a sprayer arm 33 from which it passes downwardly through the column of coffee 29 to an outlet pipe 34. To obtain the predetermined solvent level 20 the discharge end of outlet pipe 34 may be elevated as shown.

From the foregoing it will be apparent that the column of coffee continuously moves upward through the descending solvent in true countercurrent relation, and in the course of its ascent its caffein content is gradually extracted. The solvent used may be trichlorethylene or any other suitable organic solvent and is introduced in a heated state, preferably at a temperature of from 155° F. to 165° F. As it flows downward through the ascending coffee its concentration of caffein gradually increases until it flows out through pipe 34 as spent solvent. The rate of discharge of extracted coffee may be controlled by raising or lowering the discharge rake 31 or the solvent level and thus can be made equal to the rate at which moist coffee is introduced. Preferably I effect this control by varying the solvent level which raises or lowers the column of coffee with respect to the discharge rake. In the form shown, the discharge end of pipe 34 is fitted with a telescopic section 35 which can be raised and lowered by suitable means such as an adjusting screw 36 to vary the solvent level 20. Spent solvent overflows from section 35 into a receiver 37 from which it is withdrawn through a pipe 38.

Fig. 3 illustrates the unit for removing residual solvent from the extracted coffee which is supplied thereto by a pipe 39 communicating with discharge chute 30. In the form shown, the apparatus comprises a vertical vessel 40, the coffee being introduced at the top and discharged at the bottom through a funnel 41. While vessel 40 may be of any suitable cross-sectional shape it is preferably made rectangular to facilitate the use of discharge mechanism covering its entire cross-sectional area and thereby assure a uniform rate of descent of the coffee in the vessel throughout its entire cross-sectional area. The discharge mechanism may be of any suitable type, but preferably consists of alternately arranged cooperating stationary members 42 and oscillating members 43 covering the entire cross-sectional area of the vessel above funnel 41. The stationary members 42 are triangular in shape to guide the treated coffee to the oscillating members 43, which are provided with oppositely disposed pockets which alternately fill with coffee and discharge the same into funnel 41 during oscillation of the members. Solvent-free coffee is thus discharged at substantially the same rate over the entire cross-sectional area of vessel 40 causing the coffee therein to move progressively downward at substantially the same rate throughout its entire mass. This arrangement makes possible the use of a smaller vessel for a given rate of flow of coffee and assures uniform and complete solvent removal from the entire mass of coffee in a minimum length of time.

To effect the removal of solvent from the beans steam is introduced into the bottom of vessel 40 in a manner insuring its even distribution throughout the entire mass of coffee. This is preferably accomplished by utilizing the stationary members 42 as steam channels and providing them with suitable outlet openings 44 over their entire length. The steam passes upwardly through the coffee and escapes from vessel 40 through an outlet pipe 45 leading to a condenser 46 in which the solvent is recovered. The coffee moves progressively downward in counter-current relation to the steam while gradually losing its solvent content and its rate of discharge from vessel 40 is preferably adjusted by regulating the frequency of oscillation of members 43 to equal the rate at which coffee is introduced into the vessel.

Referring to Fig. 1, the coffee from funnel 41 is discharged directly into the hopper 47 of a continuous drier 48, wherein the coffee is dried to its normal moisture content and from which it is discharged into a hopper 49 for passage to storage or further handling.

It will be apparent from the foregoing description that the apparatus and procedure of my invention make possible for the first time the carrying out of the four steps of coffee decaffeination on a continuous flow of coffee, with the attendant advantages of higher operating efficiency, lower labor and equipment costs and greater output. It also will be apparent that although the individual steps of the process have been shown as being carried out in single units, each of such steps may be performed in a plurality of units so coordinated as to achieve continuous operation. For example, it may be found more convenient to employ several caffein extraction units or several solvent removal units connected either in series or in parallel, depending on whichever is found more suitable. Various other changes in the apparatus and process may readily suggest themselves to those skilled in the art. Hence it is to be understood that the invention is not restricted to the particular embodiment shown and described and that reference should be had to the appended claims for a definition of the scope thereof.

What is claimed is:

1. A continuous process of decaffeinating coffee which comprises moistening the coffee to a predetermined moisture content, passing the coffee upwardly through a downwardly flowing solvent for caffein, passing the coffee downwardly through an upward flow of steam, and drying the coffee, said steps being successivey performed on a continuously moving stream of coffee.

2. A continuous process of decaffeinating coffee which comprises moistening the coffee to a predetermined moisture content, floating the coffee upwardly through a downwardly flowing solvent for caffein, passing the coffee downwardly through an upward flow of steam, and drying the coffee, said steps being successively performed on a continuously moving stream of coffee.

3. A continuous process of decaffeinating coffee which comprises adding water to a continuously moving stream of coffee at a rate providing the coffee with a predetermined moisture content, passing the stream of moistened coffee continuously upward through a downwardly flowing solvent for caffein, passing the stream of solvent-treated coffee continuously downward through an upward flow of steam, and continuously drying the stream of treated coffee.

4. A continuous process of decaffeinating coffee which comprises adding water to a continuously moving stream of coffee at a rate providing the coffee with a predetermined moisture content, floating the stream of moistened coffee continuously upward through a downwardly flowing solvent for caffein, passing the stream of solvent-treated coffee continuously downward through an upward flow of steam, and continuously drying the stream of treated coffee.

5. A continuous process of decaffeinating coffee which comprises passing a stream of coffee of predetermined moisture content continuously upward through a downwardly flowing solvent for caffein and passing the stream of treated coffee continuously downward through an upward flow of steam to remove residual solvent therefrom.

6. A continuous process of decaffeinating coffee which comprises floating a stream of coffee of predetermined moisture content continuously upward through a downwardly flowing solvent for caffein and passing the stream of treated coffee continuously downward through an upward flow of steam to remove residual solvent therefrom.

7. A process of extracting caffein from coffee which comprises forming a column of downwardly moving solvent for caffein, introducing coffee at the bottom of said column and floating it upwardly therethrough, and withdrawing said coffee at the top thereof.

8. A process of extracting caffein from coffee which comprises forming a column of downwardly moving solvent for caffein, maintaining a floating column of coffee in the solvent extending a substantially constant distance above the level thereof, withdrawing from the top of said column of coffee the portion thereof above a fixed level, and varying the solvent level to regulate the rate of withdrawal.

9. A process of extracting caffein from coffee which comprises forming a column of downwardly moving solvent for caffein, maintaining a floating column of coffee in the solvent extending a substantially constant distance above the level thereof, withdrawing from the top of said column of coffee the portion thereof above a certain level, and varying one of said levels relatively to the other to regulate the rate of withdrawal.

10. Apparatus for continuously decaffeinating coffee comprising means for forming and continuously advancing a stream of coffee, means for adding moisture to said moving coffee, means for establishing and maintaining a column of downwardly moving solvent for caffein, means for introducing said moving stream of moistened coffee into the bottom of said column from whence it floats upwardly therethrough, means for establishing and maintaining a column of upwardly flowing steam, means for directing said moving stream of coffee from the top of said solvent column downwardly through said steam column, and means for drying said moving stream of coffee passing from said steam column.

11. Apparatus for continuously decaffeinating coffee comprising means including a conveyor for adding moisture to and continuously advancing coffee, a vessel, means for maintaining a column of downwardly moving solvent for caffein therein, means for continuously mixing said moistened coffee with solvent withdrawn from said vessel, means for continuously pumping the mixture of coffee and solvent into the bottom of said vessel wherein the coffee forms a floating column, discharge means for continuously withdrawing coffee from the top of the column thereof, means including a second vessel for establishing and maintaining an upwardly flowing column of steam, means for continuously conducting coffee discharged from said first vessel into the top of said second vessel, means for continuously discharging the coffee from the bottom of said second vessel at a rate substantially uniform over the entire cross-sectional area thereof, and means for continuously drying coffee discharged from said second vessel.

12. Apparatus for continuously extracting caffein from coffee which comprises a vessel, means for maintaining a column of downwardly moving solvent for caffein in said vessel, means for withdrawing solvent from the lower portion of said column and mixing it with coffee to be extracted, pump means for feeding the mixture of coffee and solvent into the bottom of said vessel wherein the coffee forms a floating column, and means for withdrawing extracted coffee from the top of said latter column.

13. Apparatus for continuously extracting caffein from coffee which comprises a vessel, means for maintaining a column of downwardly moving solvent for caffein therein, means for feeding coffee to be extracted into the bottom of said vessel wherein it forms a floating column having its top extending a substantially constant distance above the solvent level, means for withdrawing from the top of said coffee column the portion thereof extending above a fixed level, and means for varying the solvent level with respect to said fixed level to regulate the rate of coffee withdrawal.

14. Apparatus for continuously extracting caffein from coffee which comprises a vessel, means for maintaining a column of downwardly moving solvent for caffein therein, means for feeding coffee to be extracted into the bottom of said vessel wherein it forms a floating column having its top extending a substantially constant distance above the solvent level, means for withdrawing from the top of said coffee column the portion thereof extending above a certain level, and means for varying one of said levels relatively to the other to regulate the rate of coffee withdrawal.

THOMAS M. RECTOR.